United States Patent [19]
Wanner

[11] Patent Number: 5,438,588
[45] Date of Patent: Aug. 1, 1995

[54] DIRECT CURRENT-ELECTRIC ARC FURNACE SYSTEM

[75] Inventor: Ernst Wanner, Turgi, Switzerland

[73] Assignee: ABB Management AG, Baden, Switzerland

[21] Appl. No.: 214,211

[22] Filed: Mar. 17, 1994

[30] Foreign Application Priority Data

Mar. 25, 1993 [DE] Germany .................. 43 09 640.9

[51] Int. Cl.[6] ............................................. H05B 7/144
[52] U.S. Cl. .................................... 373/108; 373/102; 373/104
[58] Field of Search ................. 373/108, 102, 104, 105

[56] References Cited

U.S. PATENT DOCUMENTS

| | | | |
|---|---|---|---|
| 4,324,944 | 4/1982 | Weihrich et al. | 373/105 |
| 4,607,373 | 8/1986 | Bergman | 373/104 |
| 4,663,764 | 5/1987 | Bretthauer et al. | 373/104 |
| 4,677,643 | 6/1987 | Dicks | 373/105 |
| 4,683,577 | 7/1987 | Bretthauer et al. | 373/105 |
| 5,155,740 | 10/1992 | Ao et al. | 373/108 |

FOREIGN PATENT DOCUMENTS

| | | |
|---|---|---|
| 0483405 | 5/1992 | European Pat. Off. . |
| 0498239 | 8/1992 | European Pat. Off. . |
| 3000996 | 7/1981 | Germany . |
| 3508323 | 9/1985 | Germany . |
| 1048436 | 11/1966 | United Kingdom . |

OTHER PUBLICATIONS

"Flickermeter-Functional and Design specifications", publication 868 (1986).
Bordignon, Paolo, u.a.: Statische Kompensation von Blindleistung. In: etz, Bd.106, 1985, H.24, S. 1264–1266.

Primary Examiner—Bruce A. Raynolds
Assistant Examiner—Tu Hoang
Attorney, Agent, or Firm—Oblon, Spivak, McClelland, Maier, & Neustadt

[57] ABSTRACT

The direct current-electric arc furnace system includes a furnace vessel 8, one or more electric arc electrode 7 connected as a cathode, a bottom contact 12 connected as an anode, a furnace transformer 2 and a rectifier assembly 5 for feeding the furnace, an electrode control system E, and a current regulator I. A choke 6 is switched into the direct current main current circuit. A voltage control circuit F underlies the current control circuit I, whereby the output voltage of the current regulator 14 delivers the desired value for the voltage regulator 24. A filter 25 tuned to the flicker frequency follows the voltage regulator 24 with a frequency response, which is tuned to the frequency sensitivity of the human eye. Optionally, an additional control voltage signal $U_{flick}$ that is delivered by flicker meter can be provided to the voltage control circuit F. With a furnace control constructed in such a manner it is possible to obtain an optimal integration of the effective power that is made available by the furnace transformer 2 and rectifier 5 and simultaneously to dampen modulation swings and thus reactive power surges that lead to flicker.

4 Claims, 1 Drawing Sheet

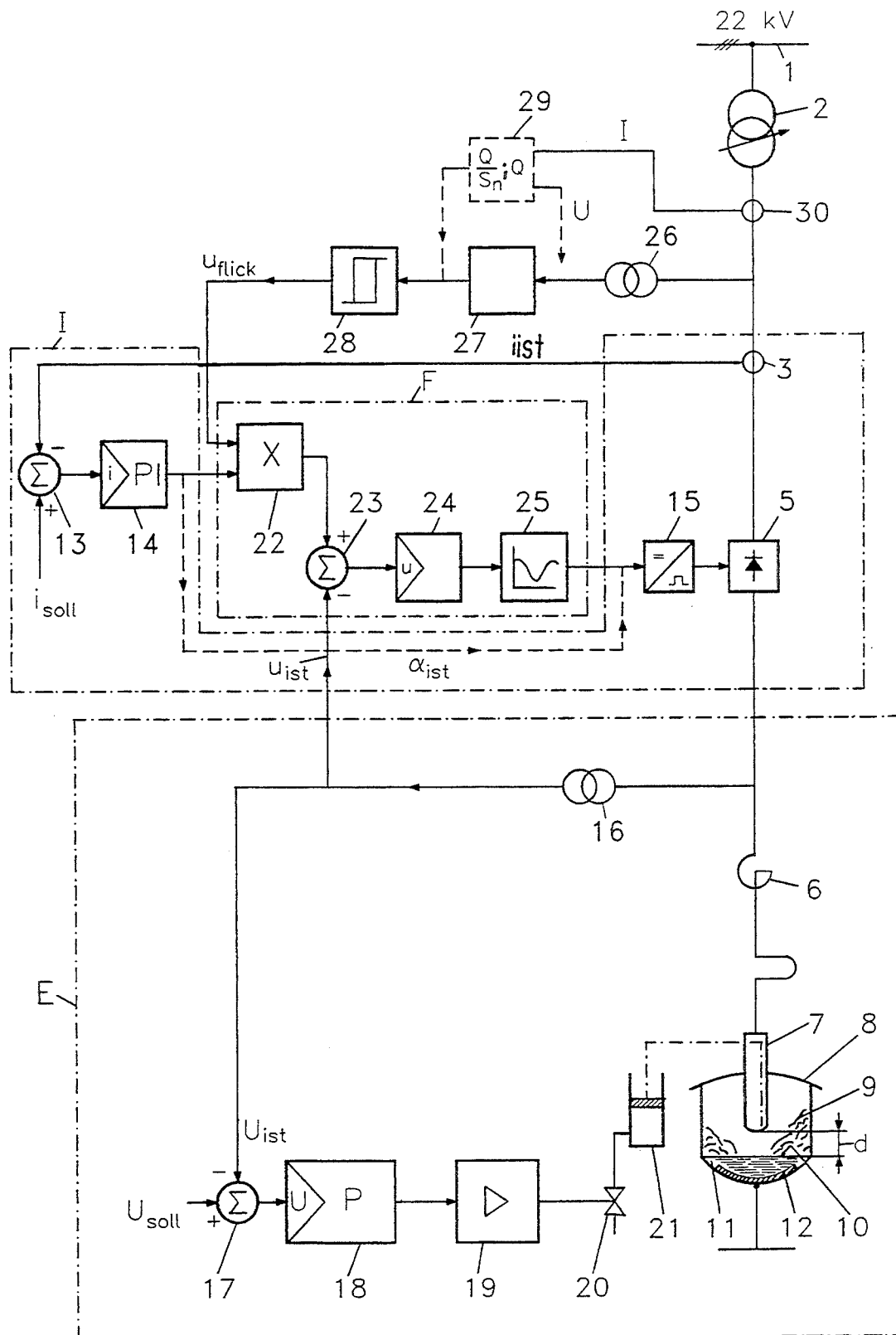

DIRECT CURRENT-ELECTRIC ARC FURNACE SYSTEM

BACKGROUND OF THE INVENTION

1. Field of the Invention

The invention relates to a direct current-electric arc furnace system comprising a furnace vessel, one or more electric arc electrodes, connected as a cathode, a bottom contact connected as the anode, a furnace transformer and a rectifier assembly for feeding the furnace, and an electrode control system and a current regulator, whereby a choke is switched into the direct-current lines from the rectifier to the bottom contact.

The starting point for the invention is an electrode control, which is, for example, the subject matter of the European patent application 0 498 239.

2. Description of the Related Art

In direct current-electric arc furnace systems the electric arc jumps suddenly in the course of the meltdown process from one piece of scrap to the other. In this manner the length and resistance of the electric arc changes suddenly. A dynamic, high quality current regulator has the task of limiting the resulting current changes to a minimum, in order to protect the rectifier of the controller even in extreme cases, e.g. when the electrode short-circuits with the scrap, from overloads and eventual distruction of the thyristor converters.

Both the current fluctuations and to a greater degree the widely varying modulation phase angle of the rectifier produce, due to the control action, reactive load surges at the supply network.

These reactive load variations are critical for the fluctuations in voltage at the supply network. If they exceed a certain limit, the consumers connected to the same network are disturbed. The fluctuations in voltage can be perceived in an unpleasant manner by means of light fluctuations, socalled flicker.

Official specifications force the operators of such systems to measures that virtually eliminate the flicker. If an expansion of the supply mains is out of the question, the only possibility to date has been to equip the furnace system with a SVC device (SVC =Static Var Compensation—static flicker compensation). Cf. the corporate document of BBC Brown Boveri AG, Baden (Switzerland) "Electric Arc Systems 'Arcmelt', AL model series", document no. CH-IH 512 484, undated, where on pages 20–22 a reactive power and flicker compensation for three phase electric arc furnace systems is described and shown, or U.S. Pat. No. 5,155,740, whose subject matter is a flicker compensator for direct current electric arc furnace systems. However, such devices for direct current-electric arc furnace systems are expensive, since they require high power rectifiers, chokes and capacitors.

SUMMARY OF THE INVENTION

The invention is based on the problem of providing a direct current-electric arc furnace system which enables a flicker-free operation even with weak power mains, thus those with low short-circuit power.

This problem is solved according to the invention in that a voltage control circuit underlies the current control circuit, where the actual value for the voltage regulator is derived from the voltage applied to the rectifier, and the output signal of the current regulator supplies the desired value for the voltage regulator, and that a filter tuned to the flicker frequency follows the voltage regulator with a frequency response, which is tuned to the frequency sensitivity of the human eye.

By using a choke with high inductance in combination with such a current and voltage control unpleasant effects of a direct current-electric arc furnace on the supply network can be dramatically reduced.

The large choke in the direct current branch acts as an energy store, which can absorb or dissipates energy for a short period, in order to dissipate energy, for example, when the electric arc is elongated, or to absorb energy, for example, when the electric arc is shortened. Thus, the rapid current fluctuations at the electric arc furnace are damped, a feature that has already a reducing effect on the fluctuations in reactive load. This measure is critical for the design of the control.

Of course, the current regulator still has the task of holding the adjusted electric arc current, yet the high dynamic no longer has first priority. Rather the voltage regulator underlying the current control has higher priority with respect to the suppression of the reactive load fluctuations or flicker.

The embodiment of the invention and its advantages are explained in detail with reference to the drawing.

BRIEF DESCRIPTION OF THE DRAWINGS

The single figure of the drawing shows diagrammatically one embodiment of the invention in a block diagram of a direct current-electric arc furnace system with a current control circuit and an electrode control circuit.

DETAILED DESCRIPTION OF THE PREFERRED EMBODIMENT

The single figure of the drawing shows a furnace transformer 2 with several switching stages, which is connected, on the one hand, to an alternating current mains with alternating voltage of 22 kV, for example, and, on the other hand, to the alternating voltage input of a rectifier 5. The direct voltage side of the rectifier 5 is connected by way of a choke 6 to an electric arc electrode 7 (cathode) of an electric arc furnace 8. A bottom contact 12 (anode), mounted in the bottom region of the electric arc furnace 8, is connected to the positive pole of the rectifier 5. As an alternative the choke 6 can also be arranged in the direct current feed line to the bottom contact 12. An electric arc 10 burns between the bottom end of the electric arc electrode 7 and a charge or scrap, which is to be melted and is denoted as 9, and with the surface of the melt or a molten bath 11. The letter d denotes an electrode distance or the distance between the electric arc electrode 7 and the molten bath 11.

To hold the electric arc current constant and to influence the position of the electric arc electrode, there is a furnace control, which comprises a current control circuit I and an electrode control circuit E. Both control circuits are shown by means of dash-dotted lines.

A current transformer 3 in the alternating current feed line to the rectifier 5 detects a current actual value signal $i_{ist}$ which is fed to the negating input of a comparator or summator 13. A specifiable current desired value signal $i_{soll}$ is fed, e.g. from a potentiometer (not illustrated) to the non-negating input of this summator 13. On the output side the summator 13 is connected to a current regulator 14 with proportional integral characteristic (PI controller), which normally delivers a rectifier-correcting variable signal $\alpha_{ist}$, corresponding to a firing angle, directly to a firing pulse transformer 15, which controls the rectifier 5 on the output side.

In the electrode control circuit E a rectifier-correcting variable signal $U_{ist}$ is obtained from the electric arc voltage by means of a voltage transformer 16 and directed to the negating input of a summator 17, to whose non-negating input is fed a specifiable electrode controller-reference input signal $U_{soll}$, corresponding to a firing angle desired value in the range of 15°–50°, preferably in the range of 25°–35°. On the output side the summator 17 is connected to a voltage regulator 18 with a proportional characteristic (P controller), which acts on the output side by way of a valve amplifier 19 on a valve 20 of an electrode adjusting device 21. The electrode adjusting device 21, e.g. a hydraulic pump with an adjusting mechanism and an electrode speed controller, is mechanically coupled to the electric arc electrode 7 and enables its height adjustment; it acts as a first order delay element.

The electrode control functions about slower than the current control. The cathode 7 is adjusted vertically in that the rectifier 5 functions on average with a modulation of, e.g. 35° el., irrespective of the secondary voltage of the furnace transformer 2 and an adjusted desired current value $i_{soll}$.

In this respect direct current-electric arc furnace systems and their furnace control are known and described, for example, in the already cited EP-O 498 239 A1 and shall, therefore, to be discussed only briefly at this point.

In the course of the melt-down process the charge (scrap) to be melted collapses and the distance between electrode and charge to be melted changes as a consequence. First, the resulting increased current demand is met by way of the current control. Since unlimited voltage is not available at the rectifier 5, in order to maintain the current flow and in order that the electric arc may not become arbitrarily long for stable operation, the electrode control E acting on the hydraulic electrode adjusting device 21 provides for on average constant lengths or constant voltage of the electric arc.

To suppress or at least to reduce to a minimum the flicker phenomena described earlier, a voltage control circuit F underlies, according to the invention, the current control circuit I. The output signal of the current regulator 14 delivers the desired value for this voltage regulator. The output voltage of the rectifier 5 is supplied from the voltage regulator F as the desired value.

At this point the decisive factor for the reducing effect for the reactive load fluctuations or flicker is the design of this voltage regulator F. It comprises a multiplier 22 to whose first input the output signal of the current regulator 14 is fed. The other input is (firstly) at a constant level. The output of the multiplier 22 is connected to the non-negating input of a summator 23. The rectifier-correcting variable signal $U_{ist}$ is fed to the negating input of the summator. A voltage regulator 24 with PID characteristic follows the summator. Before the output signal of the voltage regulator 24 is fed to the rectifier adjusting element (firing pulse transformer 15), this signal passes through a filter 25 with band elimination characteristic. This filter 25 exhibits a frequency response characteristic, which is also tuned to the flicker frequency perceived to be disturbing by the human eye. This dependence is documented in the IEC report "Flickermeter—Functional and design specifications", publication 868 (1986), published by the Bureau Central de la Commission Electrotechnique Internationale, 3, rue de Varembé, Geneva, Switzerland. The filter 25 assumes this frequency response characteristic in the sense that the frequency with the highest sensitivity—which is approximately 9 Hz—is damped the most. This filter 25 acts synergistically together with the choke 6 in the direct current main circuit of the electric arc furnace. The choke can absorb energy for a short term (when the electric arc is shortened) or dissipate energy (when the electric arc is elongated). Thus, very rapid current fluctuations are damped at the electric arc furnace, a feature that has already a reducing effect on the reactive load fluctuations and thus the flicker. Less rapid current fluctuations are compensated by means of the current control with underlying frequency-dependent voltage control. Thus, the modulation swings at the rectifier 5 and thus the reactive load deviation in the supply mains 1 is reliably damped in the most sensitive flicker range. Even though the dynamics of the current control no longer has first priority, overloads at the rectifier 5 are also avoided due to the positive effect of the energy store in the direct current main circuit, i.e. damping of the current fluctuations.

The measures described above are generally adequate to reduce the reactive load fluctuations or the flicker in the sensitive frequency range of the human eye. For extremely weak networks—regarded always in relation to the furnace power—these measures cannot, however, always be adequate to fall below the disturbing limit. For these cases, the invention provides that an additional control voltage signal $U_{flick}$ be superimposed on the voltage control circuit F. This superimposition is accomplished in such a manner that a correction value, corresponding to the flicker and derived from the mains voltage (behind the furnace transformer 2), is fed to the other input of the multiplier 22. This correction value is obtained by means of a voltage transformer 26 from the mains voltage in a flicker meter 27 and led by way of a signal range signaling device 28 with adjustable sensitivity level to said multiplier 22. A suitable flicker meter 27 can be, for example, the flicker meter described in the aforementioned IEC report, page 29, FIG. 1.

The advantages that can be obtained with this measure lie especially in the fact that the parameters of the (underlaid) voltage regulator (F) can be optimized by means of the measured flicker value with respect to maintaining the threshold values for non-disturbing or imperceivable flicker.

The flicker meter can also be replaced by a reactive load meter 29 for a different evaluation of the flicker. A current signal is fed to this device by means of a current transformer 30 behind the furnace transformer 2; and a voltage signal is fed from the voltage transformer 26 to said device. The relative voltage deviations at this network can be derived from the reactive power variations through division of the short-circuit power of the network. This method is very suitable for electric power companies, which demand merely a limiting of the maximum voltage fluctuations, thus no evaluation of the eye sensitivity.

If is self-evident that the frequency response characteristics of the energy store (choke 6), current regulator I and the voltage regulator F underlying said current regulator, have to be adjusted in such a manner that the objectives of the flicker-free network, as constant a direct current as possible for maximum power utilization for the electric arc furnace and no dangerous overloads of the rectifier 5, are fulfilled. The automatically variable time constant in the direct current main current circuit $T = L/R$ (L = inductance of the storage choke 6, R = variable electric arc resistance) is reduced by means of an adapting time response of the current regulator I. The electrode control E, following the current-voltage control system with addition of the measured flicker value, no longer takes part in reducing the flicker, since the dynamics of this control is an order of magnitude slower than that in the current control circuit I with its underlying voltage control circuit F.

The parameters of the current control circuit I have to be adapted to the variable parameters of the system, in order to ensure a dynamically optimal response of the control circuit with respect to the correction time and stability. The parameters of the current regulator are adapted as a function of the system.

What is claimed is:

1. A direct current-electric arc furnace system comprising:
    a) a furnace having
        (i) a furnace vessel,
        (ii) at least one electric arc electrode connected to said furnace vessel and serving as a cathode, and
        (iii) a bottom contact connected to said furnace vessel and serving as an anode;
    b) a furnace transformer for supplying a voltage between said anode and said cathode of said furnace to generate an electric arc current therebetween;
    c) an electrode control circuit for controlling a position of said electric arc electrode;
    d) a current control circuit, for maintaining said electric arc current constant, said current control circuit including a rectifier connected between said furnace transformer and said at least one electric arc electrode, for regulating a voltage supplied from said furnace transformer to said at least one electric arc electrode; and
    e) a voltage regulating circuit including
        (i) a multiplier for receiving a voltage output from said current control circuit and multiplying said voltage by a first value to generate an output,
        (ii) a summing circuit for summing said output of said multiplier and a voltage output from said rectifier to generate a voltage output,
        (iii) a voltage regulator for regulating said voltage output from said summing circuit, and
        (iv) a filter exhibiting a frequency characteristic which is tuned to a filter frequency perceivable by the human eye, for eliminating components of said output of said voltage regulator having said filter frequency and outputting a filtered signal to said rectifier for controlling said voltage applied to said at least one electric arc electrode.

2. A direct current-electric arc furnace system according to claim 1, wherein said first value of said multiplier is a correction value generated in accordance with said voltage supplied by said furnace transformer.

3. A direct current-electric arc furnace system according to claim 2, further comprising:
    a voltage transformer for transforming said voltage supplied by said furnace transformer;
    a flicker meter for receiving an output of said voltage transformer and detecting reactive power surges and flicker in said output; and
    a signalling device for receiving an output of said flicker meter and generating said correction value to be supplied to said multiplier.

4. A direct current-electric arc furnace system according to claim 2, further comprising:
    a voltage transformer for transforming said voltage supplied by said furnace transformer;
    a reactive power meter for receiving an output of said voltage transformer and detecting reactive power surges in said output; and
    a signalling device for receiving an output of said reactive power meter and generating said correction value to be supplied to said multiplier.

* * * * *